Figure 1:
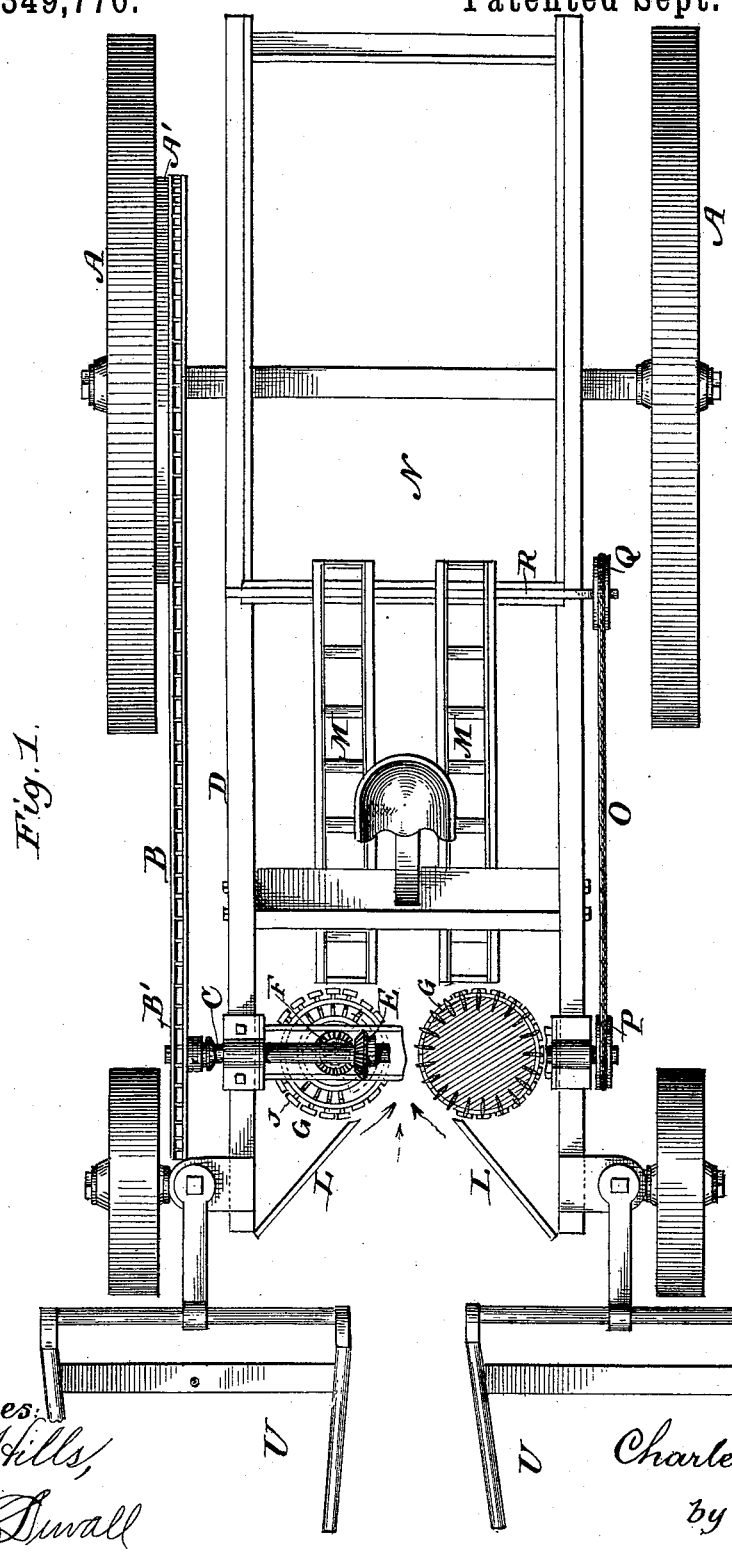

(No Model.)  3 Sheets—Sheet 1.

C. E. WRIGHT.
COTTON HARVESTER.

No. 349,776.  Patented Sept. 28, 1886.

Witnesses:
D. C. Hills,
Wm. Duvall

Inventor:
Charles E. Wright,
by E. E. Masson
atty.

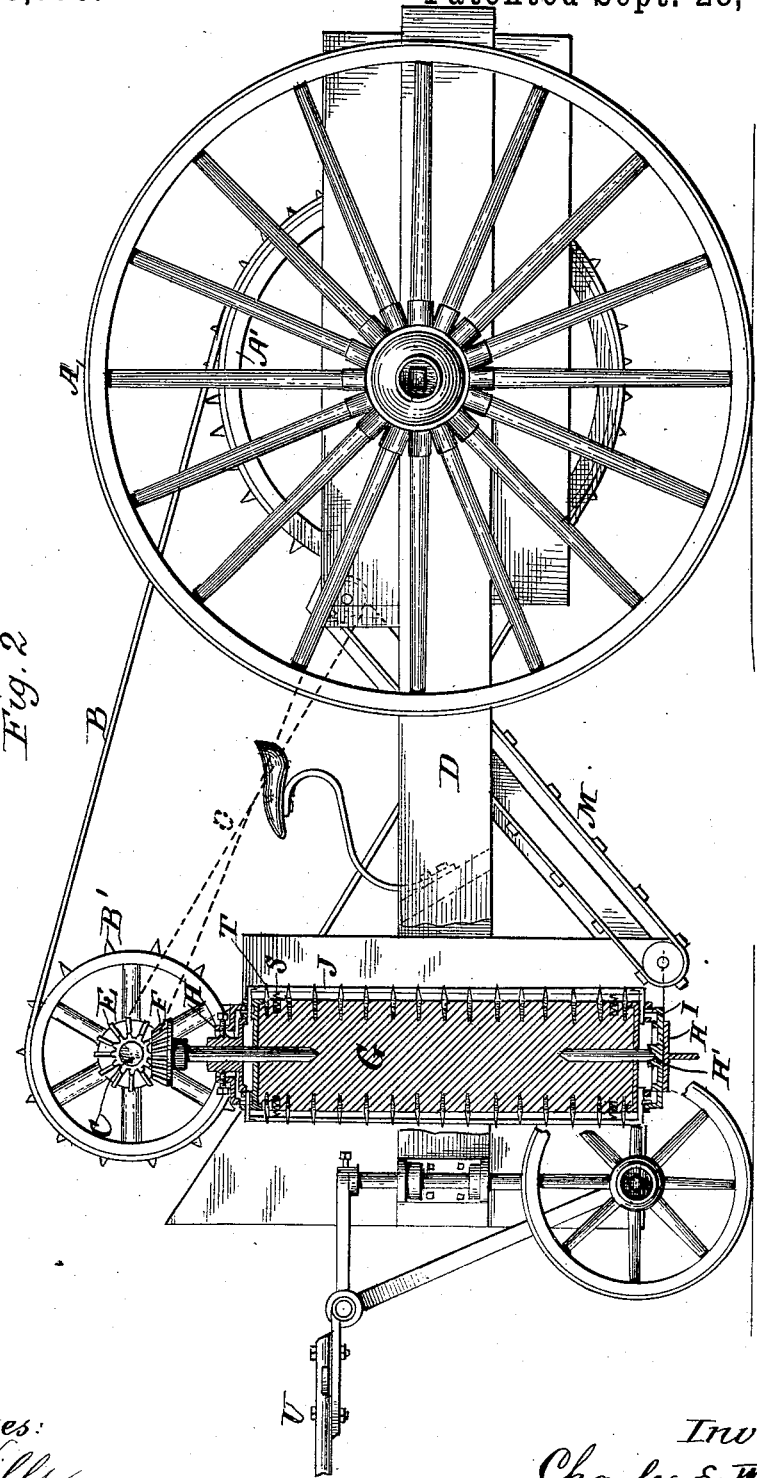

(No Model.) 3 Sheets—Sheet 3.
C. E. WRIGHT.
COTTON HARVESTER.
No. 349,776. Patented Sept. 28, 1886.
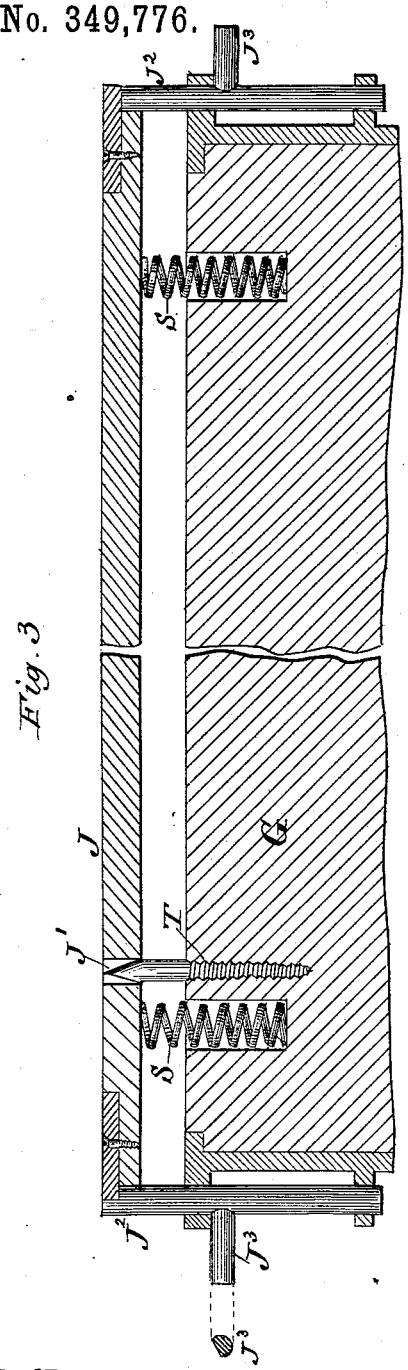
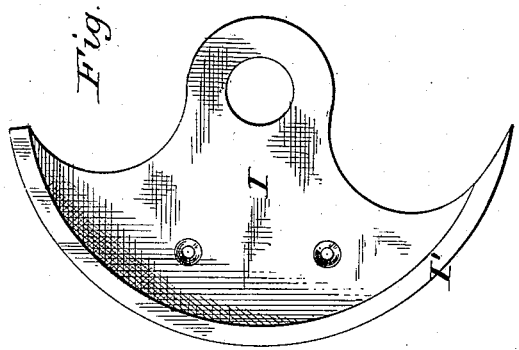
Witnesses:
D. C. Hills,
Wm Duvall
Inventor:
Charles E. Wright,
by E. E. Masson
atty.

UNITED STATES PATENT OFFICE.

CHARLES E. WRIGHT, OF VICKSBURG, MISSISSIPPI.

COTTON-HARVESTER.

SPECIFICATION forming part of Letters Patent No. 349,776, dated September 28, 1886.

Application filed August 9, 1884. Serial No. 140,114. (No model.)

*To all whom it may concern:*

Be it known that I, CHARLES E. WRIGHT, a citizen of the United States, residing at Vicksburg, in the county of Warren and State of Mississippi, have invented certain new and useful Improvements in Cotton-Harvesters, of which the following is a specification, reference being had therein to the accompanying drawings.

This invention has relation to cotton-harvesters of that class which comprise picking-cylinders to remove the cotton from the stalks, endless carriers, and a bin, the whole mounted on wheels and adapted to be drawn astride rows of cotton for the purpose of gathering the cotton; and the invention consists in certain features of construction, hereinafter described, and specifically set forth in the claims.

Referring to the drawings, Figure 1 is a plan of a cotton-harvester constructed in accordance with my invention. Fig. 2 is a side elevation with one of the picking-cylinders in section. Fig. 3 is an enlarged detail section of a portion of one of the picking-cylinders and certain adjuncts thereof. Fig. 4 is a cam for operating the tooth-cleaners of the picking-cylinders. Figs. 5 and 6 are edge and side views, respectively, of one of the teeth of the picking-cylinders.

Like letters indicate like parts in all the figures.

A represents the rear wheels of a harvester, one of which is provided with a sprocket, A', from which a chain, B, passes to a sprocket, B', secured to a transverse shaft, C, mounted at the front end of the frame D of the harvester. The shaft C extends entirely across the frame, and carries two miter-gears, E, only one of which is shown. These miter-gears E mesh with companion miters, F, secured to the upper ends of the shafts or spindles of the picking-cylinders G, one of which is shown in transverse section in Fig. 1.

Referring to Fig. 2, H are cross-bars of the frame above and under the picking-cylinders. The under bar supports a step, H', for the lower spindle of the picking-cylinders, and also supports a cam, I, (see Fig. 4,) which may be made separate from the step, or as a part thereof, as in Fig. 2. A similar cam is made a portion of the upper cross-bar H, through which the upper spindle passes and has its bearings. The cams I remain stationary while the cylinder revolves.

Referring now to Fig. 3, J represents what is herein designated as a "tooth-cleaner," and it consists in a rod or bar having perforations J' for all the teeth arranged in a vertical row upon the cylinder in line with and beneath the bar, so that when by suitable means the bar is compressed toward or against the surface of the cylinder the teeth are exposed or projecting, so that they may collect the cotton passing between the cylinders, and by other suitable means said bars are made to project at a distance from the cylinders to clean the teeth of any cotton collected by the same, this operation of the cleaners being timed with respect to the remaining coacting mechanism of the harvester. In this instance each of the bars J is provided at each of its ends with a radially-arranged rod, $J^2$, having a lug or arm, $J^3$, projecting vertically from the radial rod, so as to come in contact with the inner face of the projecting flange or rim I' of the cam I, said cams being so arranged at the ends of the cylinders that said lugs $J^3$ shall follow the inner surface of the cam and act to draw in the tooth-cleaners and expose the teeth at the time when, in the advancement of the harvester, the stalks and bolls are directed, by means of the hopper or guiding-walls L, into the bite of the picking-cylinders, and said lugs $J^3$ escape from the rims of the cams, so as to permit the cleaners to deliver the cotton from the teeth just at the time when the cotton conveyed by the teeth has arrived opposite the endless carriers M, by which the cotton is conveyed and delivered into the bin N. The endless carriers are operated by means of a cross-belt, O, driven by the pulley P, mounted on the end of the shaft C, and by the pulley Q, mounted on the shaft R, which carries the conveyer-pulleys. In this instance the cams I act only to draw the cleaning-bars J toward the cylinder G, while springs S, seated in the cylinders and bearing against the under surface of the bars, act to throw said bars outward from the cylinders; or, if desired, this outward action of the cleaners may be positively produced by a suitable cam acting upon the lugs $J^3$. The teeth T of the picking-cylinders have their operating end V-shaped and curved, as shown in Figs. 5 and 6, and are screw-threaded at their inner ends for insertion into the cylinder, as represented in Fig. 3, one only being shown in position in said figure. Independent thills U are pivoted to the forward end of the harvester, leaving an open passage between them, so that cotton-rows may be straddled and directed between the picking-cylinders.

The operation of my invention will be clearly understood from the foregoing description.

Having described my invention, I claim—

1. The combination of a cotton-harvester frame mounted on wheels, two vertical radially-toothed picking-cylinders provided with radially-movable tooth-cleaners perforated for the passage of the teeth on said cylinders, guide-rods controlling the movement of the tooth-cleaners, and eccentrics to withdraw and springs to project the cleaners, substantially as specified.

2. The combination of the converging guide-walls L, two vertical radially-toothed cylinders, radially-movable perforated tooth-cleaners J, guide-rods controlling their movement, and eccentrics to withdraw said cleaners and springs to project them, with conveyers M, having their rear end elevated above the front end, and a bin, N, carried on wheels, substantially as and for the purpose described.

3. The combination of the cylinders G, teeth T, and springs S therein, perforated bars J, and guide-rods $J^2$, having lugs $J^3$, substantially as shown and described.

4. The combination of the wheels A, sprocket-wheels A' B', chain B, shaft C, gears E F, cylinders G, springs S therein, bars J, cam I, and bars $J^2$, having lugs $J^3$, substantially as shown and described.

In testimony whereof I affix my signature in presence of two witnesses.

CHARLES E. WRIGHT.

Witnesses:
L. W. MAGRUDER,
J. M. GILSON, Jr.